Figure 1:
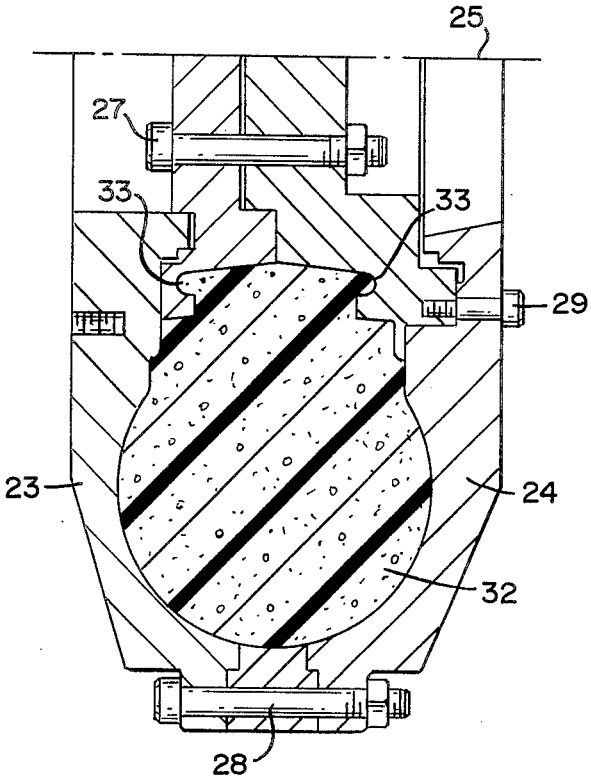
Figure 2:
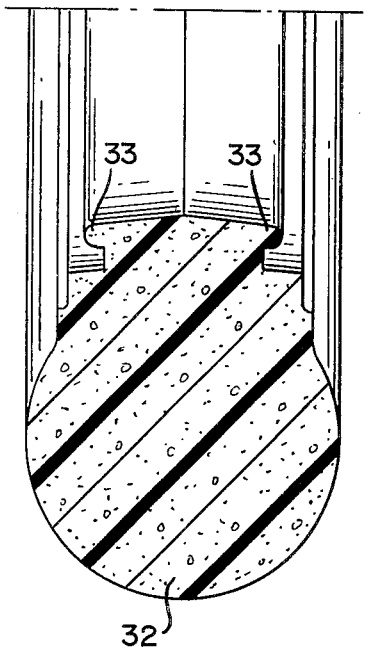
Figure 3:
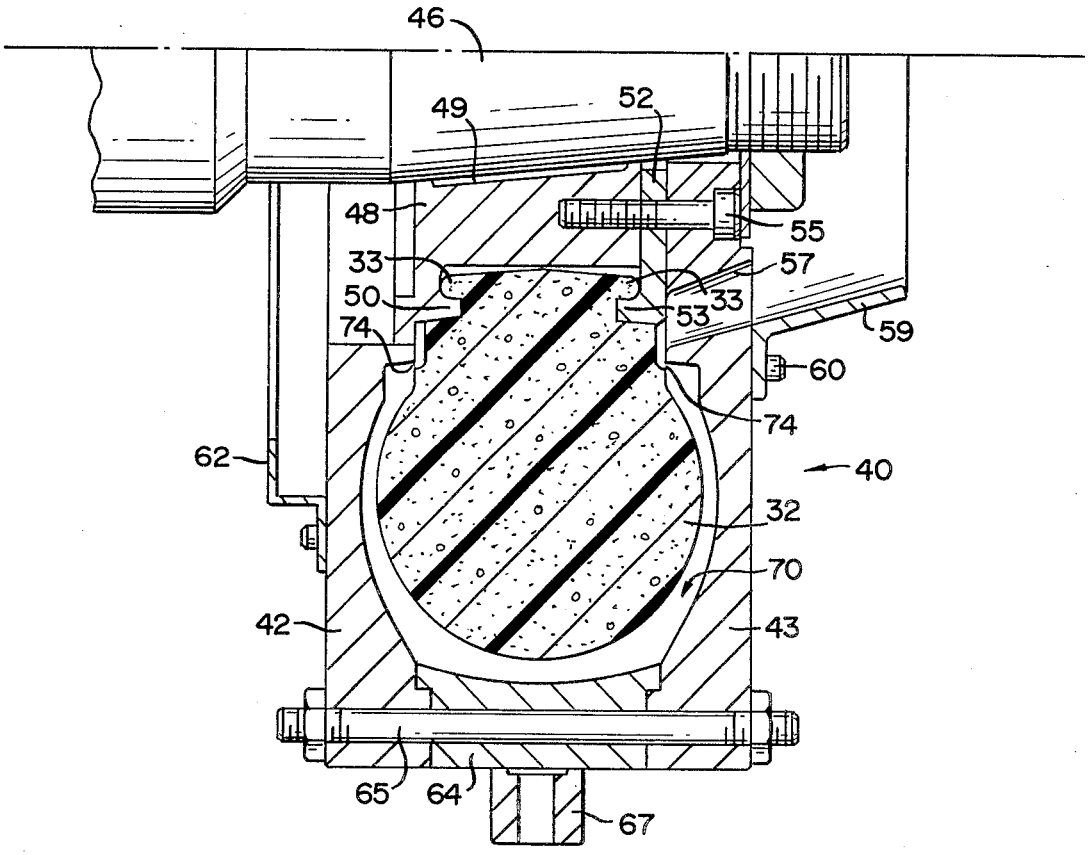
Figure 4:
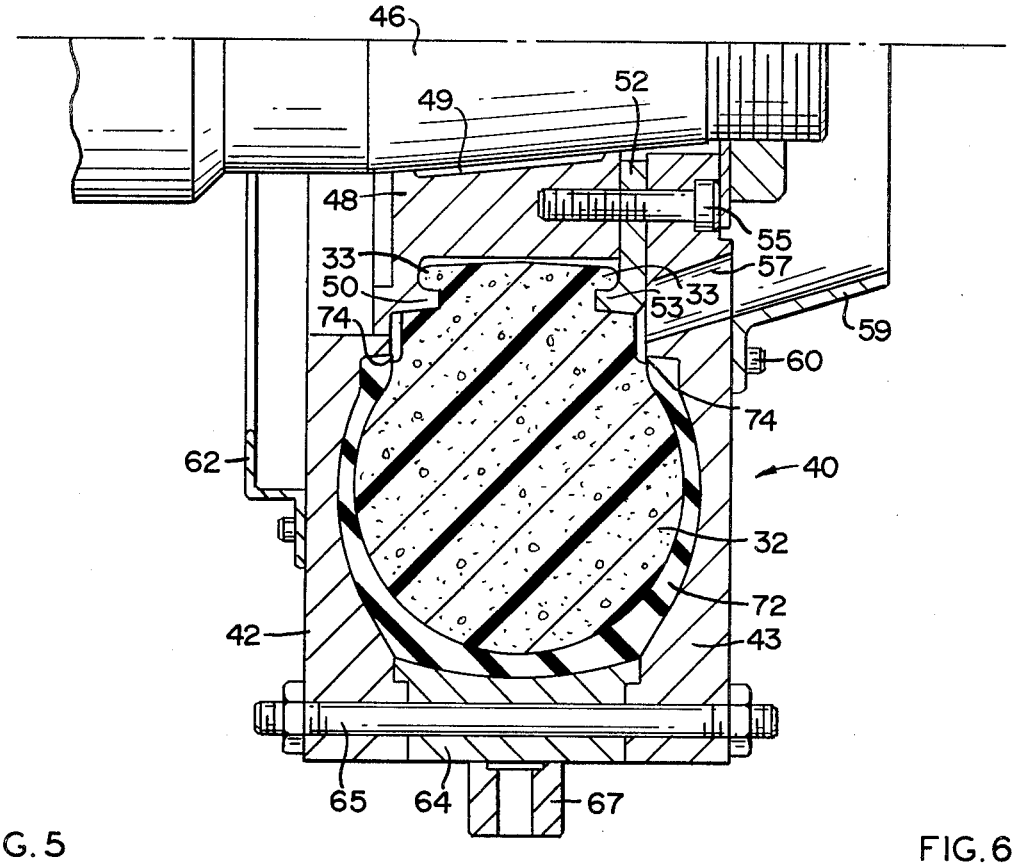
Figure 5:
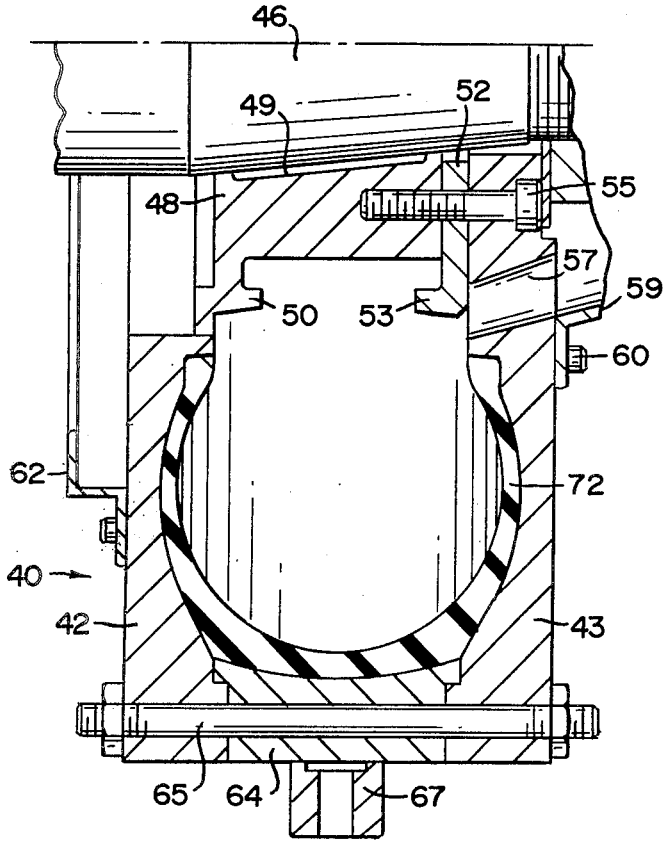
Figure 6:
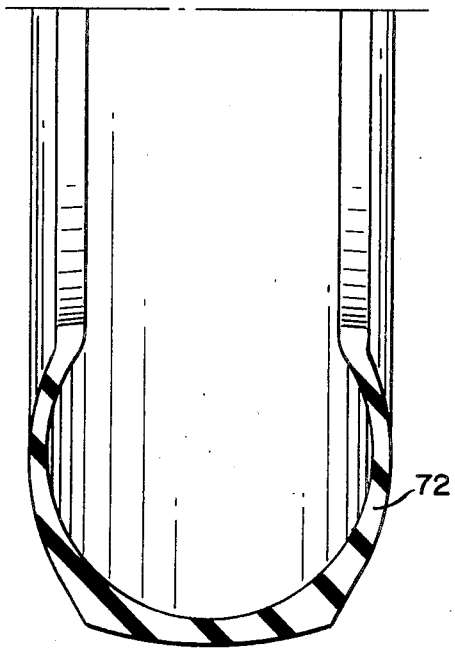

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 7

T952,006

METHOD OF PRODUCING VEHICLE TIRES

Walter R. Hausch, Akron, Ohio, assignor to The Firestone Tire & Rubber Company, Akron, Ohio

Continuation of abandoned application Ser. No. 415,268, Nov. 12, 1973. This application July 28, 1975, Ser. No. 599,810

Int. Cl.[2] B29C *5/04*

U.S. Cl. 264—311

2 Sheets Drawing. 10 Pages Specification

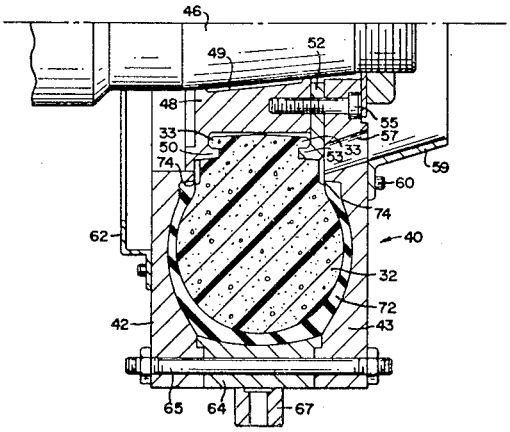

A method of making vehicle tires is disclosed which comprises making a polystyrene core and positioning it in a tire mold. A tire material like polyurethane is cast into the cavity between the mold and core and after the tire has been cast the core of polystyrene is removed by dissolving the core with a suitable solvent.